US010754953B2

(12) United States Patent
Jin et al.

(10) Patent No.: US 10,754,953 B2
(45) Date of Patent: Aug. 25, 2020

(54) TRUSTZONE-BASED SECURITY ISOLATION METHOD FOR SHARED LIBRARY AND SYSTEM THEREOF

(71) Applicant: HUAZHONG UNIVERSITY OF SCIENCE AND TECHNOLOGY, Wuhan, Hubei (CN)

(72) Inventors: Hai Jin, Hubei (CN); Weiqi Dai, Hubei (CN); Jun Deng, Hubei (CN); Deqing Zou, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 219 days.

(21) Appl. No.: 16/109,870

(22) Filed: Aug. 23, 2018

(65) Prior Publication Data
US 2019/0294798 A1    Sep. 26, 2019

(30) Foreign Application Priority Data
Mar. 22, 2018   (CN) ............................ 2018 1 0249221

(51) Int. Cl.
*G06F 21/57* (2013.01)
*G06F 9/54* (2006.01)
(Continued)

(52) U.S. Cl.
CPC .............. *G06F 21/57* (2013.01); *G06F 9/545* (2013.01); *G06F 21/44* (2013.01); *G06F 21/53* (2013.01);
(Continued)

(58) Field of Classification Search
CPC . G06F 7/04; G06F 21/57; G06F 21/53; G06F 21/74; G06F 21/44; G06F 21/62;
(Continued)

(56) References Cited

U.S. PATENT DOCUMENTS 8,745,361 B2 *   6/2014   Shah ...................... H04L 67/02
                                                                712/227
8,978,092 B2 *   3/2015   Balinsky ............... G06F 21/554
                                                                726/1
(Continued)

FOREIGN PATENT DOCUMENTS

WO    WO-2016118145 A1 *  7/2016  ............. G06F 21/52

*Primary Examiner* — Thanhnga B Truong
(74) *Attorney, Agent, or Firm* — Michael X. Ye; Morris, Manning & Martin, LLP

(57) ABSTRACT

The present invention provides a TrustZone-based security isolation system for shared library, the system at least comprising: a sandbox creator, a library controller, and an interceptor, the sandbox creator, in a normal world, dynamically creating a sandbox isolated from a Rich OS, the interceptor, intercepting corresponding system-calling information and/or Android framework APIs by means of inter-process stack inspection, the library controller, performing analysis based on the intercepted system-calling information and/or Android framework APIs, redirecting a library function to the sandbox, and switching calling states of the library function in the sandbox as well as setting up a library authority. The present invention has good versatility, low cost and high security. It realizes isolation of the library without increasing the trusted bases in the Secure World of the TrustZone, effectively reducing the risk of being attacked.

7 Claims, 4 Drawing Sheets

(51) Int. Cl.
*G06F 21/44* (2013.01)
*G06F 21/53* (2013.01)
*G06F 21/62* (2013.01)
*H04L 29/06* (2006.01)

(52) U.S. Cl.
CPC .......... *G06F 21/629* (2013.01); *H04L 63/101* (2013.01); *G06F 2221/2141* (2013.01); *G06F 2221/2149* (2013.01)

(58) Field of Classification Search
CPC ..... G06F 9/54; G06F 9/44; G06F 7/38; G06F 12/16; G06F 12/14; G06F 11/00; G06F 9/545; G06F 21/629; G08B 23/00; H04L 1/00; H04L 63/101
See application file for complete search history.

(56) References Cited

U.S. PATENT DOCUMENTS

| | | | |
|---|---|---|---|
| 9,183,412 B2* | 11/2015 | Bye | G06F 21/74 |
| 2006/0253908 A1* | 11/2006 | Yang | H04L 63/0254 726/24 |

* cited by examiner

TRUSTZONE-BASED SECURITY ISOLATION METHOD FOR SHARED LIBRARY AND SYSTEM THEREOF

FIELD

The present invention relates to mobile security, and more particularly to a TrustZone-based security isolation method for shared library and a system using this method.

DESCRIPTION OF THE RELATED ART

In recent years, mobile smart terminals have become essentials in daily life of modern people and play increasingly important roles. At the same time, the security issues accompanying with the use of mobile devices have led to serious concerns. While the use of libraries accelerates development cycles of Android apps and improves performance of these apps, the collateral risks of using shared libraries are often undervalued by app developers. First, since authority in an Android system is at the application layer, apps and the libraries they use have the same authority, and some libraries may even require even higher authority. This violates the principle that "every program (module) shall have the least authority it needs to perform a given task", and brings about the risk that some libraries abuse their authority to collect data from their users. Second, since apps and the libraries they use share the same memory, these libraries have the opportunity to manipulate the internal files of the apps, and this may also lead to breach of privacy.

Presently, there are two methods for isolation of libraries. The first one is process-based. It involves running libraries and application programs in different processes, and realizes library-program interaction through inter-process switching. However, to implement such process-based approach to library isolation, the Android frameworks or apps (or libraries) have to be modified. The second solution for library isolation is based on the use of application virtualization sandboxes, which protect privacy using fine-grained authority control when programs run. However, this existing method isolates an entire application, and thus fails to prevent the libraries (which may be malicious) the app uses from leaking its privacy.

2003, ARM Co, introduced a technology named Trust Zone, which uses hardware-grade isolation to protect data security. The TrustZone technology works by dividing system resources of a device into two parts, namely the secure world (SW) and the normal world (NW). The current status is expressed using an NS site in an SCR in CP15. The NW can only access its own resources, while the SW can access all the system resources. Communication between the two worlds is accomplished by means of Secure Monitor (Cortex-A) or core logic (Cortex-M).

The conventional approach to protection of mobile terminal applications is to simply move the contents to be protected (such as applications or shared libraries) into TrustZone, yet this can cause huge performance costs and undermine TrustZone in terms of security. Besides, moving applications into TrustZone needs negotiation with original equipment manufacturers (OEMs), and causes great inconvenience to the third-party developers.

China Patent No. 107194284 A discloses a TrustZone-based method for isolation of user data and a system using the method. The method comprises: providing a Trustzone coprocessor in a smart terminal and providing a normal memory area, a shared memory area and a secure memory area in a memory of the smart terminal; a normal world operating system running in the normal memory area storing user data to be isolated into the shared memory area, and sending a quick interrupt signal to an interrupt controller in the Trustzone coprocessor, so as to enter the Trustzone coprocessor into a monitoring mode; the Trustzone coprocessor in the monitoring mode controlling a secure world operating system to run in the secure memory area; and the secure world operating system running in the secure memory area reading the user data to be isolated from the shared memory area, and loading the user data to be isolated it reads to the secure memory area. With these steps, the prior-art method can make user data more secure.

However, the prior-art data isolation is achieved by storing isolated data in the shared memory area, and then loading the data directly to a secure memory area. The action of loading the isolated data to the secure memory area directly nevertheless has the following shortcomings:

(1) it degrades the security of the secure memory area and increases risks of attacks; and
(2) general developers are not authorized to add codes to the secure memory area, and only device manufacturers or system manufacturers can add codes to the secure memory area.

Hence, the patented invention leaves the need of isolating libraries without changing application programs and Android frameworks and increasing trusted bases in the secure world of TrustZone unmet.

SUMMARY

In view of the foregoing unmet need, the present invention provides a TrustZone-based security isolation system for shared libraries wherein the system at least comprises: a sandbox creator, a library controller and an interceptor. The sandbox creator, in a normal world, dynamically creates a sandbox isolated from a Rich OS. The interceptor intercepts corresponding system-calling information and/or Android framework APIs by means of inter-process stack inspection. The library controller analyzes the intercepted system-calling information and/or Android framework APIs, redirects library functions to the sandbox, and switches calling states of the library function in the sandbox as well as setting up a library authority.

According to a preferred mode, the interceptor inspects non-sandboxed library-function-calling behaviors, and/or the interceptor acquires physical address information of a program library in the normal world and calls the library controller to redirect the physical address information.

According to a preferred mode, the sandbox creator creates the sandbox in the normal world based on abnormity information monitored by the interceptor.

According to a preferred mode, the library controller setting up the library authority by: creating a corresponding specific thread and/or trusted base based on activation information of at least one application program, the specific thread checking a stack authority in a framework layer and/or a kernel layer based on a sensitive resource request, and based on an access request for the application program, establishing a legitimate authority of the application program by traversing programs involved by the access request.

According to a preferred mode, the library controller, based on a matching result between the system-calling information intercepted by the interceptor and a whitelist of the access control list, establishes the legitimate authority of the application program.

According to a preferred mode, the interceptor, based on operational behavior information of the application program or the library, determines a calling mode of the intercepted system-calling information.

According to a preferred mode, the library controller, based on the calling mode of the library function determined by the interceptor, redirects an initial address of the corresponding library to the sandbox, in which the library controller redirects a switching code of the sandbox.

According to a preferred mode, the library controller, based on the calling mode of the callback function determined by the interceptor, adjusts a library function pointer in the sandbox.

According to a preferred mode, the library controller isolates the library functions by rerouting a new file created by the application program to the sandbox.

According to a preferred mode, the library controller feeds back a virtual return value based on the type of a function return value, so as to protect private information.

The present invention further provides a TrustZone-based security isolation method for shared libraries, which comprises: dynamically creating a sandbox isolated from a Rich OS in a normal world, intercepting corresponding system-calling information and/or Android framework APIs by means of inter-process stack inspection, performing analysis based on the intercepted system-calling information and/or Android framework APIs, redirecting a library function to the sandbox, and switching calling states of the library function in the sandbox as well as setting up a library authority.

According to a preferred mode, the method further comprises: inspecting non-sandboxed library function-calling behaviors, and/or acquiring physical address information of a program library in the normal world and calling a library controller to redirect the physical address information.

According to a preferred mode, the method further comprises: creating the sandbox in the normal world based on the abnormality information monitored by the interceptor.

According to a preferred mode, the library controller sets up the library authority by: creating a corresponding specific thread and/or trusted base based on activation information of at least one application program, the specific thread checking a stack authority in a framework layer and/or a kernel layer based on a sensitive resource request, and based on the access request of the application program, establishing a legitimate authority of the application program by traversing programs involved by the access request.

According to a preferred mode, the method further comprises: establishing the legitimate authority of the application program based on a matching result between the system-calling information intercepted by the interceptor and a whitelist of the access control list whitelist.

According to a preferred mode, the method further comprises: determining a calling mode for the intercepted system-calling information based on operational behavior information of the application program or the library.

According to a preferred mode, the method further comprises; redirecting an initial address of the corresponding library to the sandbox based on the calling mode of the library function as determined by the interceptor, in which the library controller redirects a switching code of the sandbox.

According to a preferred mode, the method further comprises; based on a calling mode for the callback function as determined by the interceptor adjusts a library function pointer in the sandbox.

According to a preferred mode, the method further comprises: isolating the library functions by rerouting a new file created by the application program to the sandbox.

According to a preferred mode, the method further comprises: feeding back a virtual return value based on the type of a function return value, so as to protect private information.

The present invention technically has the following beneficial effects:

(1) Good versatility: with the support of Layer-1 hardware, the present invention eliminates the need of modifying the memory address space of programs. Since the sandbox restricts libraries, an application program can only access its own memory area and data it exchanges with other application programs through Java native interface (JNI). During this process, the shared properties and normal operation of libraries can be ensured without the need to modify Android frameworks or applications (or libraries) or to lamely alter the secure world in TrustZone, so the versatility is good.

(2) Low costs: the present invention creates an isolated area (a sandbox) in the normal world, and thereby reduces the performance costs caused by switching between different worlds. Furthermore, as compared to the existing approach to isolation of library functions, the present invention only runs legitimate calling of library functions, so as to effectively reduce performance costs caused by frequent and ineffective calling of library functions.

(3) High security: the present invention creates an isolated area in the normal world, rather than putting all the contents need to be protected in the secure world, so it effectively reduce the trusted bases and mitigate the risk of being attacked. In addition, the TrustZone-based sandbox creator, the library controller, and secure switching between calling states of library functions, can be well secured with the support form Layer-1 hardware in the ARM framework. Moreover, the present invention detects malicious codes from calling of library functions, APIs and all behaviors in the environment (program) during running of libraries other than system interrupts, and provides its user with feedback so that the user can use this information to identify the process and memory address where a malicious behavior is found, and stop it.

DETAILED DESCRIPTIONS OF THE INVENTION

Figure 1:
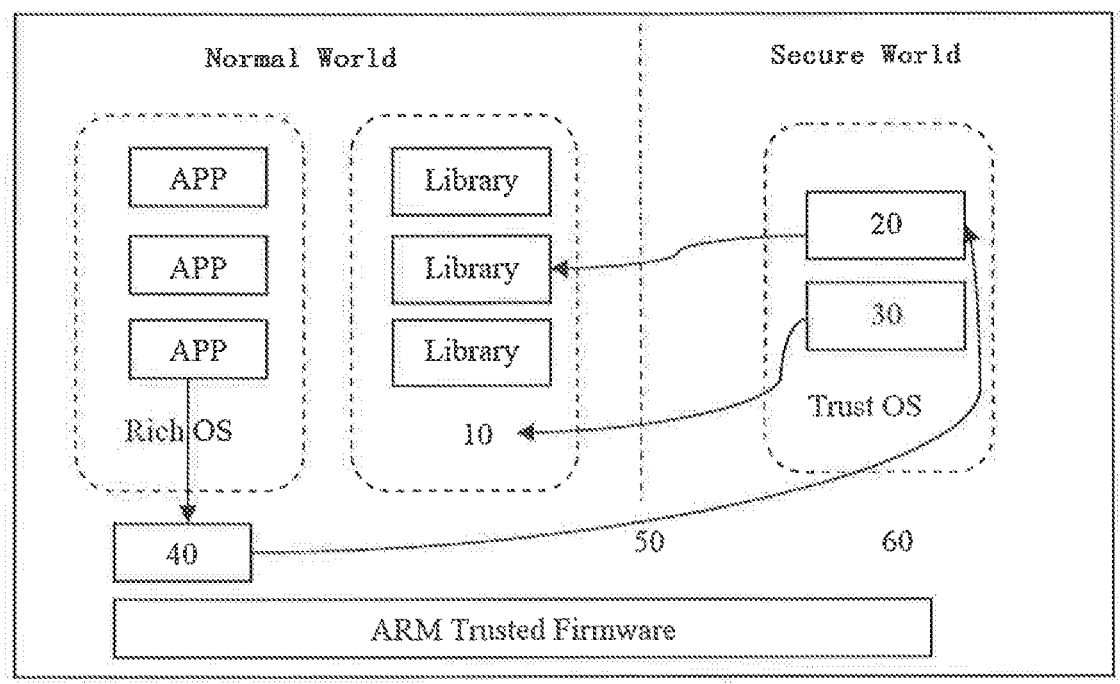
FIG. 1 is a schematic structure diagram of the security isolation system for shared library of the present invention.

The following description, in conjunction with the accompanying drawings and preferred embodiments, is set forth as below to illustrate the present invention.

It is noted that, for easy understanding, like features hear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

As used herein, the term "automatic" and its variations refer to a process or operation that is done without physical, manual input. However, where the input is received before the process or operation is performed, the process or operation may be automatic, even if the process or operation is performed with physical or non-physical manual input. If such input affects how the process or operation is performed, the manual input is considered physical. Any manual input that enables performance of the process or operation is not considered "physical".

Embodiment 1

The objective of the present invention is to realize a TrustZone-based security isolation method for shared libraries and a system using this method, so as to prevent attackers from using library vulnerability or malicious libraries to harvest private data from application programs.

In the present invention, the secure world is also referred to as the secure environment or the secure domain.

In the present invention, the normal world is also referred to as the normal environment or the normal domain.

In the present invention, the sandbox creator is positioned in the secure world, and serves to dynamically create an environment, i.e. a sandbox, isolated from Rich OS in the normal world according to practical needs.

The library controller is positioned in the secure world, and its functions include: (1) determining whether the corresponding library function calling has legitimate authority according to a configuration file, Policy.xml, defined by the developer; (2) loading the called library function to the sandbox created by the sandbox creator and running the function, and (3) returning an operational result to the application program.

Rich OS: a general operating system, running in the normal world, and corresponding to a Secure OS running in the secure world.

Secure OS: a trusted secure system, running in the secure world.

Interceptor: located in the normal world, and serving to intercept some sensitive system-calling information, to trigger and switch a secure monitor to the secure world, and to call the library controller. The sensitive system-calling information includes framework APIs or calling functions in a native C program through Java native interface (JNI).

Secure monitor: controlling switching between the secure world and the normal world.

The present invention provides a TrustZone-based security isolation system for shared libraries, as shown in FIG. 1. The TrustZone-based security isolation system for shared libraries at least comprises: a sandbox creator, a library controller, and an interceptor. The sandbox creator 30 dynamically creates a sandbox isolated from a Rich OS in a normal world 10. The interceptor 40 is positioned in the normal world and serves to intercept corresponding system-calling information and/or Android framework APIs by means of inter-process stack inspection. The library controller 20 analyzes the intercepted system-calling information and/or Android framework APIs, switches the calling states of the library function in the sandbox, and set up library authority.

Preferably, the sandbox creator 30 creates the sandbox 10 in the normal world based on abnormality information monitored by the interceptor.

Figure 2:
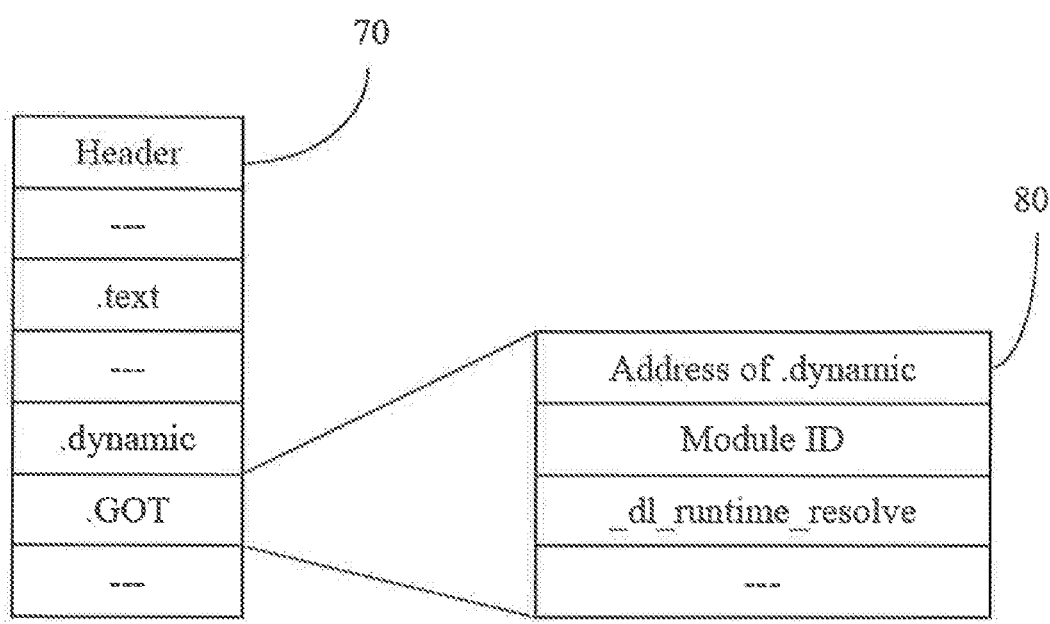
FIG. 2 is a .GOT (global offset table) table for a redirection library function of the interceptor according to the present invention.
Figure 3:
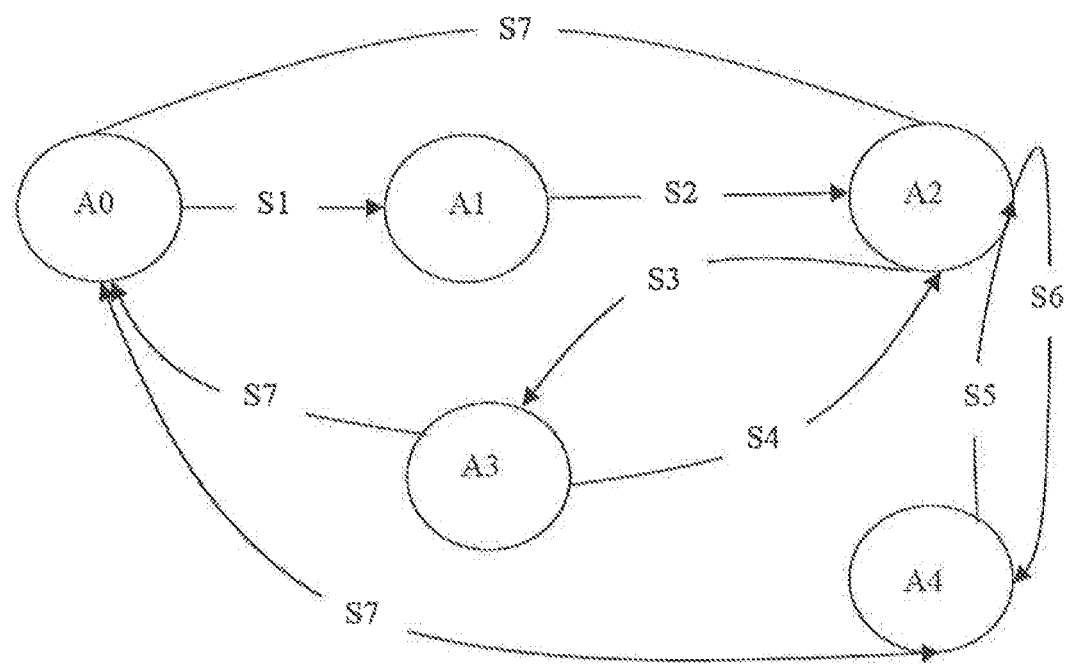
FIG. 3 is a flowchart of environment switching according to the present invention.

For example, the interceptor 40 acquires physical address information of a program library in the normal world according to a kernel data structure in the Rich OS. As shown in FIG. 2, the libraries in Android are some files in a relocatable ELF (Executable and Linkable Format). When loaded, they are mapped to the same address space as applications are. The switching of address space happening when a library function of an application program is called is realized by modifying the .GOT (global offset table) table. To call a library function, the interceptor 40 first retrieves its address from the .GOT table, and executes the code. The address in the .GOT table is modified into a pointer for monitoring the function, thereby redirecting the calling aimed at the library to the specified function.

The library controller sets up the library authority by: creating a corresponding specific thread and/or trusted base based on activation information of at least one application program, the specific thread checking a stack authority in a framework layer and/or a kernel layer based on a sensitive resource request, and based on an access request for the application program, establishing a legitimate authority of the application program by traversing programs involved by the access request.

For example, for activation of each APP, the library controller creates a specific-purpose thread, Stacktrace, and creates a trusted module for each APP, acting as the trusted base of the application authority system. The thread Stacktrace performs different stack authority checks in the framework layer and in the kernel layer, respectively, for different types of sensitive resource request.

When the program module in an application program requests to access user mode resources corresponding to a service, it is to determine whether the application program has legitimate authority by consulting an application program Package Manager, and traversing all the program modules involved by the current request.

When the program module in an application program requests to access kernel mode resources corresponding to a service, it is to determine whether the application program has legitimate authority by intercepting the corresponding system calling, and checking against the whitelist in the access control list of the library controller.

Preferably, the secure, reliable sandbox 10 is dynamically created in the normal world by the sandbox creator 30 located in the secure world. In the present invention, the sandbox 10 may be referred to as an isolate world.

As shown in FIG. 1, once the sandbox 10 is created, it only allows access control from a trusted program Trust App authorized in the secure world, and blocks any other reading or writing to the area in the sandbox 10. The trusted program Trust App includes the sandbox creator 30 and the library controller 20.

Preferably, the TrustZone system operates with the following steps.

S1: Power on.

At the first place, all the device in the TrustZone system are in a power-off state A0. When the TrustZone system is powered, the TrustZone system comes into the secure world for the first time, and enters its secure activation state A1.

S2: Loading sandbox control program.

In the secure activation state A1, the bootloader of the secure read-only memory image (ROM image) initializes the critical code. At the same time, the secure bootloader sets up a secure area in the normal world through TrustZone to load the secure application program. For example, a sandbox control program and a library control program are loaded into the corresponding hardware chip sandbox controller 30 and the library controller 20. At this time, the TrustZone system is in the sandbox controller state A2. Then the Rich OS state A4 is activated.

S3: Loading library control program and switching from the sandbox controller state A2 to the sandbox state A3.

S4: Exiting the sandbox state A3, and returning to the sandbox controller environment controller state A2.

To call a library, the Rich OS sends a SMC system calling request. At this time, the system is switched into the sandbox controller state A2 to create a secure sandbox. The library controller calls the modified, dynamically loaded API to redirect the library to the sandbox state A3, so as to ensure that the library can only securely operate within a specified range, and return after operation.

S5: Loading the library, and switching from the Rich OS state A4 to the sandbox controller state A2.

S6: Through loading/switching, switching from the sandbox controller state A2 to the Rich OS state A4.

S7: Power off.

No matter which state the TrustZone system is in, once it is powered off, it enters the power-off state A0.

Preferably, the library controller 20 establishes the legitimate authority of the application program based on the matching result between the system-calling information intercepted by the interceptor 40 and the access whitelist.

Preferably, the interceptor 40 determines a calling mode for the intercepted system-calling information based on operational behavior information of the application program or the library.

Preferably, the library controller 20, based on the library function calling mode as determined by the interceptor 40, redirects an initial address of the corresponding library to the sandbox. Therein, the library controller redirects a switching code of the sandbox.

Preferably, the library controller 20 adjusts the library function pointer in the sandbox 10 based on the callback function calling mode as determined by the interceptor 40.

Preferably, library controller 20 isolates the library function by re-routing the new file created by the application program to the sandbox 10.

Preferably, the library controller 20 feeds back a virtual return value based on the type of a function return value, so as to protect private information.

Particularly, the present invention modifies the dynamically loaded API (including dlopen, dlsym and dlclose) of the Rich OS in the normal world to send the process signal of the application program to the library controller when the library is loaded into the address space of the program. Then, through reading and modifying the memory information recorded in the corresponding kernel, the library can be redirected to the sandbox 10.

The present invention allows state switching in the process of calling the library functions and calling the callback functions in the sandbox, and enables authority control of libraries. Particularly, determination is done according to the system calling intercepting information acquired by the interceptor, and the behaviors of the application programs or libraries during operation. When it is a library function being called, the library controller 20 extracts the initial address of the initial address used in the program form the global offset table (GOT) stored in the program binary file, and redirects it to the created sandbox 10. Therein, the library controller 20 further serves to redirect the application program library in the Rich OS and the switching code of the sandbox 10. When it is a callback function being called, the library controller 20 modifies the library function pointer in the sandbox. When the library function called for callback, the library function pointer in the sandbox is pointed to the Rich OS. When the library function returns from calling, the library function pointer in the sandbox 10 is pointed to the sandbox, and at the same time the library function is verified for authority.

Preferably, the system calling intercepting information acquired by the interceptor includes sensitive operations and function callings, i.e. framework APIs or calling functions in the native C program through Jive: native interface (JNI).

Preferably, an application developer may clearly apply the authority required by using individual libraries. Thus, what the developer has to do is to create a new Policy.xml file in the assets file, and the libraries used can have different authorities. The library controller 20 can determine whether a calling for a library is legitimate by referring to the Policy.xml. First, it is to determine whether the file being operated is in the application memory according to the route of the file. In the event that the file is outside the memory, it is to determine whether the file has corresponding authority. In the event that the file is inside the memory, it is to determine whether it is in the isolated file space assigned to the library.

Preferably, the disclosed TrustZone-based secure isolation system for shared libraries further includes a program analyzing module. The program analyzing module performs malicious-behavior detection on operational behaviors of the library, and provides a user with a security prompt when any malicious behavior is detected, so that the user can stop the malicious behavior. Particularly, a program analyzing module is created in the sandbox to analyze the control flow of a program being executed to see whether the program is malicious. Once a malicious behavior is detected, this information is securely presented at the user interface through a secure display device in the secure world, so as to warn the user to stop the malicious behavior of the program. Preferably, the secure display device is one or more of a display, LCD screen, and a touch screen, which can display information.

Preferably, in the present invention, the sandbox 10 may be one or more of a chip, a server, and a processor, which can form an isolate. Preferably, the program analyzing module in the sandbox includes one or more of an application-specific integrated chip, a microprocessor, and a server that can detect malicious behaviors.

In the present invention, the library controller 20 may be one or more of a chip, a server, and a processor capable of calling the library.

In the present invention, the sandbox creator 20 may be one or more of a chip, a server, and a processor that can create the sandbox.

In the present invention, the interceptor 40 may be one or more of a chip, a server, and a processor that can analyze and intercept information.

In the present invention, the secure monitor 50 may be one or more of a chip, a server, and a processor that has a security monitoring function.

The present invention further includes a secure boot 60, for secure activation when the TrustZone system is powered on. The secure boot 60 may be one or more of a chip, a server, and a processor that can activate the system securely.

Preferably, the processor used herein is a processor supporting TrustZone.

Preferably, the present invention may be used in an application as described below.

In the secure world in TrustZone, a secure, trusted sandbox controller is created. When the secure monitor captures a SMC instruction or hardware abnormality in the normal world (including interrupt request (IRO), fast interrupt request (IFIQ), external data abort, prefetch abort, etc.) a sandbox isolated from the Rich OS is created in the normal world (the isolated libraries can only access data in this sandbox). Afterward, the library controller in the secure world extracts the initial address of the library used by the program from the global offset table (GOT) stored in the program binary file, and redirects it to the sandbox created by the sandbox controller. At the same time, according to the Policy.xml file provided by the developer (the developer clearly knows which authority is required by the library he/she calls), the required data is loaded to the sandbox created by the sandbox creator. At last, the operational result in the sandbox is sent back to the program.

Embodiment 2

The present embodiment is further improvement based on Embodiment 1, and the repeated description is omitted herein.

Figure 4:
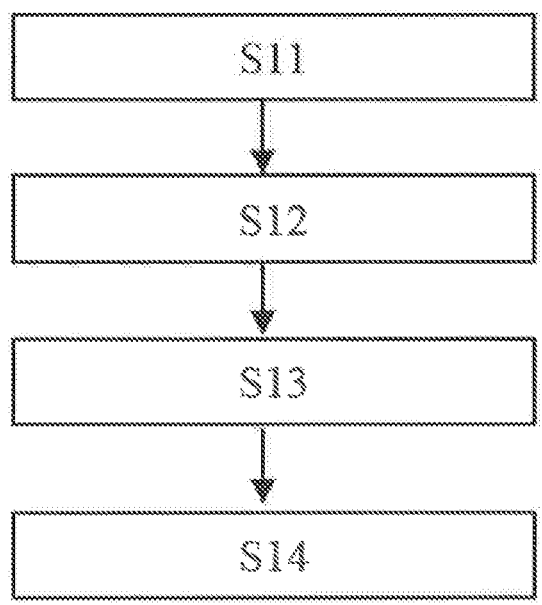
FIG. 4 is a flowchart of the method of the present invention.

As shown in FIG. 4, the present invention further provides a TrustZone-based secure isolation method for shared libraries. The disclosed method comprises the following steps:

S11: dynamically creating a sandbox isolated from a Rich OS in a normal world,

S12: intercepting corresponding system-calling information and/or Android framework APIs by means of inter-process stack inspection;

S13: performing analysis based on the intercepted system-calling information and/or Android framework APIs, redirecting a library function to the sandbox, and switching calling states of the library function in the sandbox as well as setting up a library authority.

Preferably, the disclosed method may further comprise the following step:

S14: performing malicious-behavior detection on operational behaviors of the library, and providing a user with a security prompt when any malicious behavior is detected, so that the user can stop the malicious behavior.

According to a preferred mode, the method further comprises: inspecting non-sandboxed library-function-calling behaviors so as to give out a security prompt.

According to a preferred mode, the method further comprises: creating the sandbox in the normal world based on the abnormality information monitored by the interceptor.

According to a preferred mode, the library controller sets up the library authority by: creating a corresponding specific thread and/or trusted base based on activation information of at least one application program, making the specific thread check a stack authority in a framework layer and/or a kernel layer based on a sensitive resource request, and based on an access request for the application program, establishing a legitimate authority of the application program by traversing programs involved by the access request.

According to a preferred mode, the method further comprises: establishing the legitimate authority of the application program based on a matching result between the system-calling information intercepted by the interceptor and a whitelist of the access control list whitelist.

According to a preferred mode, the method further comprises: determining a calling mode for the intercepted system-calling information based on operational behavior information of the application program or the library.

According to a preferred mode, the method further comprises: redirecting an initial address of the corresponding library to the sandbox based on the calling mode of the library function as determined by the interceptor. Therein the library controller redirects a switching code of the sandbox.

According to a preferred mode, the method further comprises: adjusting a library function pointer in the sandbox based on a calling mode for the callback function as determined by the interceptor.

According to a preferred mode, the method further comprises: isolating the library functions by rerouting a new file created by the application program to the sandbox.

According to a preferred mode, the method further comprises: feeding back a virtual return value based on the type of a function return value, so as to protect private information.

While the above description has illustrated the present invention in detail, it is obvious to those skilled in the art that many modifications may be made without departing from the scope of the present invention and all such modifications are considered a part of the present disclosure. In view of the aforementioned discussion, relevant knowledge in the art and references or information that is referred to in conjunction with the prior art (all incorporated herein by reference), further description is deemed necessary. In addition, it is to be noted that every aspect and every part of any embodiment of the present invention may be combined or interchanged in a whole or partially. Also, people of ordinary skill in the art shall appreciate that the above description is only exemplificative, and is not intended to limit the present invention.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure comprises description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, comprise rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public.

What is claimed is:

1. A TrustZone-based security isolation system for shared library, the system having a normal world and a secure world, the system comprising:
   a sandbox creator, a library controller, and an interceptor, wherein the sandbox creator and the library controller are located in the secure world, and wherein:
   the sandbox creator is configured to dynamically create a sandbox isolated from a Rich OS in the normal world based on abnormity information monitored by the interceptor;
   the interceptor is configured to intercept corresponding system-calling information and an Android framework application programming interface by means of inter-process stack inspection;
   inspect non-sandboxed library-function-calling behaviors;
   acquire physical address information of a program library in the normal world; and
   call the library controller to redirect the physical address information;
   the library controller is configured to:
   perform analysis based on the intercepted system-calling information and the Android framework application programming interface;
   redirect a library function to the sandbox;
   switch calling states of the library function in the sandbox; and
   setting up a library authority.

2. The TrustZone-based security isolation system for shared library of claim 1, wherein the library controller sets up the library authority by:
   creating a corresponding specific thread and trusted base based on activation information of at least one application program;
   the specific thread checking a stack authority in a framework layer and a kernel layer based on a sensitive resource request; and
   based on an access request for the application program, establishing a legitimate authority of the application program by traversing programs involved by the access request.

3. The TrustZone-based security isolation system for shared library of claim 2, wherein the library controller is further configured to establish the legitimate authority of the application program based on a matching result between the system-calling information intercepted by the interceptor and a whitelist of the access control list.

4. The TrustZone-based security isolation system for shared library of claim 3, wherein the interceptor is further configured to determine a calling mode of the intercepted system-calling information based on operational behavior information of the application program or the library.

5. The TrustZone-based security isolation system for shared library of claim 4, wherein the library controller is further configured to, based on the calling mode of the library function determined by the interceptor, redirect an initial address of the corresponding library to the sandbox, in which the library controller redirects a switching code of the sandbox.

6. The TrustZone-based security isolation system for shared library of claim 4, wherein the library controller is further configured to adjust a library function pointer in the sandbox based on the calling mode of the callback function determined by the interceptor.

7. A TrustZone-based security isolation method for shared library having a normal world and a secure world, the method comprising:
   monitoring abnormity information;
   dynamically creating a sandbox isolated from a Rich OS in & the normal world based on the monitored abnormity information;
   intercepting corresponding system-calling information and an Android framework application program interface by means of inter-process stack inspection;
   performing analysis based on the intercepted system-calling information the Android framework application program interface;
   redirecting a library function to the sandbox;
   switching calling states of the library function in the sandbox;
   setting up a library authority;
   inspecting non-sandboxed library-function-calling behaviors;
   acquiring physical address information of a program library in the normal world; and
   calling a library controller to redirect the physical address information.

* * * * *